United States Patent [19]

Melber et al.

[11] Patent Number: 4,898,892

[45] Date of Patent: Feb. 6, 1990

[54] METHODS FOR PREPARING OPAQUE COATINGS AND APPLYING THE SAME

[75] Inventors: George E. Melber, Depew; Leon Wolinski, Checktowago, both of N.Y.

[73] Assignee: Pierce & Stevens Corporation, Buffalo, N.Y.

[21] Appl. No.: 362,316

[22] Filed: Jun. 6, 1989

Related U.S. Application Data

[60] Division of Ser. No. 225,755, Jul. 29, 1988, which is a continuation-in-part of Ser. No. 28,119, Mar. 19, 1987, Pat. No. 4,722,943, and a continuation-in-part of Ser. No. 103,203, Oct. 1, 1987, and a continuation-in-part of Ser. No. 103,204, Oct. 1, 1987, said Ser. No. 28,119, is a division of Ser. No. 103,203, , which is a division of Ser. No. 103,204.

[51] Int. Cl.⁴ .............................. C08J 9/22; C08J 9/32
[52] U.S. Cl. ...................................... 521/54; 427/222; 427/373; 428/408; 521/57; 521/58; 521/59; 521/134; 521/149
[58] Field of Search ................ 521/54, 57, 58, 59, 521/134, 149; 427/222, 373; 428/408

[56] References Cited

U.S. PATENT DOCUMENTS

| | | | |
|---|---|---|---|
| 4,397,799 | 8/1988 | Edgren et al. | 264/53 |
| 4,513,106 | 4/1989 | Edgren et al. | 521/58 |
| 4,722,943 | 2/1988 | Melber et al. | 521/54 |

*Primary Examiner*—Morton Foelak
*Attorney, Agent, or Firm*—Waldron & Associates

[57] ABSTRACT

Enhanced hiding power for opacifiers in paints, inks, and other coatings is provided by employing the opacifiers, such as $TiO_2$, $ZnO$, talc, $CaCO_3$, and the like, adhered to or embedded in the surface of thermoplastic microspheres. The composite opacifier-microsphere material is readily formed with a preselected specific gravity, so that there is little tendency for the material to separate. In addition, the composite behaves in the coating as a opacifier-air interface, having a very high different in refractive indices, and exceptional hiding power. The high volume to weight ratio of the composite affords very attractive economic advantages, effectively reducing the weight proportion of opacifiers required in the formulations, and other related advantages.

13 Claims, 1 Drawing Sheet

METHODS FOR PREPARING OPAQUE COATINGS AND APPLYING THE SAME

RELATED CASES:

This is a division of application Ser. No. 225,755, filed July 29, 1988, which is a continuation in part of the prior application of Melber, Wolinski, and Oswald, Ser. No. 028,119, filed Mar. 19, 1987, for COMPOSITION AND PROCESS FOR DRYING AND EXPANDING MICROSPHERES, now U.S. Letters Pat. No. 4,772,943, issued Feb. 2, 1988.

This application is also a continuation in part of the copending applications of Melber, Wolinski, and Oswald, Ser. No. 103,203, filed Oct. 1, 1987, for THERMOPLASTIC MICROSPHERES, and Ser. No. 103,204, filed Oct. 1, 1987, for SYNTACTIC POLYMER FOAM COMPOSITIONS CONTAINING MICROSPHERE FILLERS, each of which is a division of the aforementioned Ser. No. 028,119.

Benefit of each of the foregoing applications is hereby claimed under the provisions of 35 U.S.C. 120.

BACKGROUND OF THE INVENTION

Technical Field

The technical field of the present invention is coatings and paints and to new and improved opacifiers affording enhanced hiding power and of opacifier materials having a specific gravity controllable to values significantly lower than typical in the prior art and often substantially the same as the coating vehicle and thus having little tendency to settle or float or otherwise separate from the coating formulation.

SUMMARY OF THE INVENTION

The present invention, in specific terms, relates to composite materials for use as opacifiers in a wide variety of coatings, and diverse types of coatings, paints, and the like.

More particularly, the present invention relates to a composite of dry, expanded thermoplastic microspheres having adhered to or embedded in the surfaces thereof inorganic opacifier materials, such as titanium dioxide., zinc oxide, calcium carbonate, talc, and the like.

Still more particularly, the invention relates to such composites where the proportions of the microsphere component and the opacifiers, and the degree of expansion of the microspheres can be balanced to afford a specific gravity of the composite material as necessary to prevent floating or settling in the continuous phase of the paint vehicle, i.e., generally within the broad range of about 0.1 to 2.8 gm/cc, and preferably about 0.15 to 1.5 gm/cc.

PRIOR ART

A wide diversity of opacifiers are known to paint and coating technology, and the present invention can be employed, with suitable adjustments for the specific characteristics of the materials selected, with any of them.

As those of ordinary skill in the art will well understand, the present invention will be described in relation to the most commonly employed of such materials. While this is not intended to exclude the employment of still other opacifier materials, it is believed that the full nature of the present invention and the parameters which should guide the art in its use will be most conveniently and fully understood in relation to such materials. These include, as mentioned above, such materials as titanium dioxide, in both anatase and rutile forms, zinc oxide, calcium carbonate, talc, and where appropriate t the discussion, other related materials.

The opacifiers of the prior art have specific gravities which are generally quite high, ranging from about 1.75 up to as much as about 4.5. As those of ordinary skill in the art are well aware, these materials have a decided tendency to separate from the medium and settle, often as a hard settlement.

It is also common, in order to achieve the opacities desired, to employ the opacifiers in quite substantial proportions, most often in excess of the "critical pigment volume" required in order to achieve a degree of porosity which produces a pigment or opacifier air interface which enhances the opacity of the coating when dry. Such porosity, however, can lead to infiltration of environmental liquids, i.e. water from rain or the like, which operates to displace air from the pores, wet the pigment, thus reducing the effectiveness of the opacifier and greatly reducing the durability of the coating.

The role of opacifiers in coating and paint technology are generally well understood by practitioners in the art. The opacifiers of the present invention are well behaved specimens within the spectrum of familiar, and well known materials, and will give those of ordinary skill in the art little difficulty once the central properties and parameters which distinguish the materials from the conventions of the known materials are clearly defined and understood.

As the art well understands, it is ordinarily the difference in refractive indices between the coating binder and the opacifier material which dictates the hiding power of a particular coating. That is, the greater the difference in refractive indices at each occurance of interface between the coating binder and the opacifier material, the greater the hiding power of the coating. Coating binders have refractive indices which typically are in the vicinity of about 1.5 or 1.6. Opacifiers are most often materials having refractive indices greater than about 1.8, and are more effective, generally, as the refractive index increases. Titanium dioxides, having refractive indices greater than 2, are among the most effective opacifiers in general use, and are often preferred for that reason.

It has long been known that air, having a refractive index of 1.0, makes a superior interface with opacifiers, and that making paints and coatings porous by exceeding the "critical pigment volume"or "CPV", loading opacifiers at the surface, and the entrainment of air in the coating formulation can all enhance the hiding power. This technique, by creating an interface of air and opacifier, is known to be quite effective, but in some contexts results in the compromise of other properties of the coating formulation or the resultant coating.

The inclusion of air also enhances opacity through the airbinder interface, since the binder has refractive index which is materially different from that of air. This attribute of such systems is lesser than the air-opacifier interface effect.

The behavior of binders, opacifiers, and the inclusion of air through one or more of the techniques known to the art are all well known, and are in fact well quantifiable through the application of the Lorentz-Lorenz equations and the Fresnel equations. Both diffraction and dispersive effects are accounted for through these techniques. Through the application of the techniques known to the art, hiding power of a particular coating formulation can be predicted quantitatively with considerable reliability.

The materials referred to herein as expanded or expandable thermoplastic microspheres are most often the materials described in Morehouse, U.S. Pat. No. 3,615,972, and like materials. These materials are per se known in the art, and do not as such form a part of the present invention. While such materials are disclosed in a substantial number of prior art teachings, the Morehouse patent cited above is the most complete description of the materials and their formation, and is hence the most relevant and material such teaching in relation to the present invention.

The microspheres described in the Morehouse patent have been employed in coatings of a variety of types. Representative of such teachings are Wolinski, U.S. Pat. No. 4,006,273, and Wolinski, U.S. Pat. No. 4,044,176. These, like all known teachings relating to the inclusion of microspheres in coatings, do not relate directly to opacifiers or hiding power of the coatings, and are thus materially different from the present invention.

The use of opacifiers, as discussed herein, is a vast, well documented practice in the art. The use of such materials to render coatings opaque is not per se a part of the present invention.

SUMMARY OF THE INVENTION

According to this invention, traditional opacifiers are combined with thermoplastic, expandable microspheres under conditions which result in the solid, opacifiers being adhered to or embedded in the surface of the microspheres, which are expanded to afford a specific gravity of the coating formulation and the composite which taken together reduces the tendency for "floating" or "settling". The composite has exceptional hiding power when formulated into paints. Coatings based on the composites have exceptional performance at materially reduced opacifier loadings and cost.

SUMMARY DESCRIPTION OF THE DRAWINGS

The attached single drawing is a microscopic illustration of a typical microsphere-opacifier composite according to this invention.

DETAILED DESCRIPTION

Figure 1:
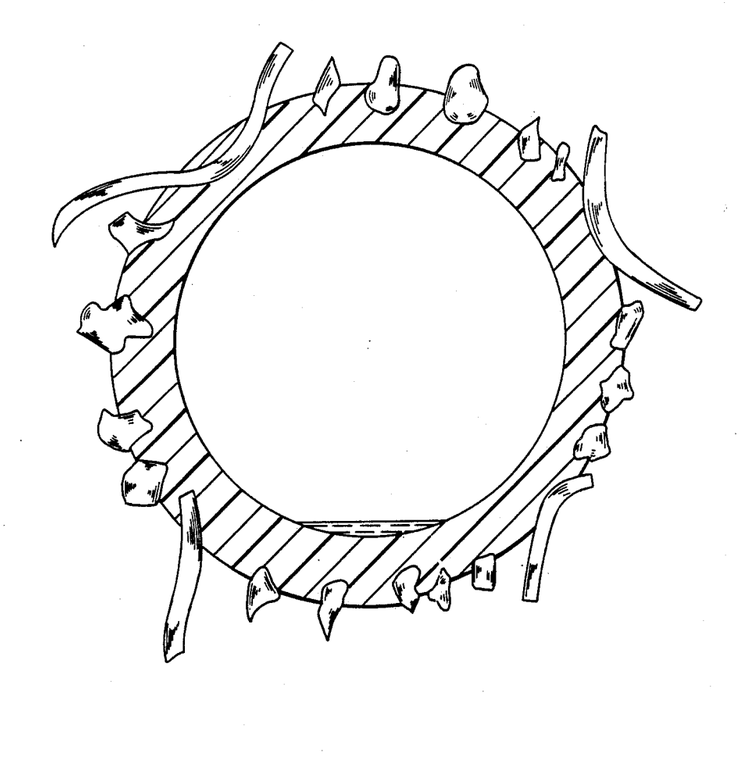

The present invention is based on the employment of a new form of opacifier. The opacifier of the present invention is a composite of expanded thermoplastic microspheres, having adhered to or embedded in the surface thereof an particulate opacifying component.

The composite is formed by the procedure disclosed in the prior copending parent applications of Melber, Wolinski and Oswald, cited above. The disclosure of the foregoing applications are incorporated herein by reference. The present composite opacifier is a species of the product disclosed and claimed in that application, with the following points of distinction:

In the present invention, the solid particulate materials are limited to those which can serve the opacifying function in paints and related coatings. In the parent, there are many organic particulate materials which would not be effective in the present invention, having refractive indices too low to be effective in the this context.

In the present invention, the proportion of microspheres and opacifying component, and the extent of expansion of the beads, are carefully balanced to afford a controlled specific gravity of the composite after expansion. This feature reduces the tendency for separation of the composite from the paint formulation on standing.

In furtherance of the same objective, the degree of expansion of the microspheres in the procedure is controlled to afford the target specific gravity. This will, in some cases, require some expansion of the microspheres, but rather less than the full expansion of which those materials are capable.

As used in the present application, microspheres are any of the thermoplastic hollow spheres containing a blowing agent and which are thermally expandable to form light weight hollow structures. Most often, the microspheres of interest are those formed in accordance with the Morehouse patent cited herein above, which materials are generally available as commercial materials. The commercial versions are made of polyvinylidene chloride, and contain alkane blowing agents. Unless otherwise indicated herein, these are the preferred materials, and are those referred to, unless otherwise specifically identified as some other material. As an example of such other material, good results have also been achieved with "ROPAQUE OP-62", manufactured by Rohm and Haas Company, Independence Mall West, Philadelphia, Pennsylvania, under U.S. Pat. No. 4,427,836 - Kowalski, Jan. 24, 1984. As commercially sold, this product has a thin shell of an expandable polymer with a particle size of 0.40 microns and contains water as the blowing agent.

In the context of the present invention, it is generally preferred to utilize microspheres of the smallest available sizes, on the order of 0.2 to 0.5 microns in diameter.

The opacifier component may be any of the solid particulate materials commonly employed in the technology of inorganic paint opacifiers. Such materials include rutile and anatase $TiO_2$, $ZnO$, $CaCo_3$ talc, clay materials, and the like. The particle size requirements of such materials is observed to be of less significance in the present invention than in usual circumstances, although it will generally be most effective to employ particle sizes of diameter near that of the wave lengths of visible light, as is common to the art. Because of the enhanced opacities achieved with the opacifiers of the present invention, a desired degree of opacity will often be attained with a lesser grade of material, or even a less effective material than is ordinarily required in customary formulations.

The characteristics of the microspheres has precluded many approaches to their drying and pre-expansion. Severe agglomeration and adherence of the materials to warm surfaces of equipment have eliminated from serious consideration most approaches to such procedures. Wet expansion in steam is of limited use when dry microspheres are needed, and the spray drying procedure is so expensive, and the product so prone to excessive, and extremely difficult, dusting problems, that the effective development of the potential markets has been limited by such factors.

It has been observed that particulate opacifier components can be employed, in substantial proportions by weight, which prevent agglomeration of the microspheres upon drying and expansion, and that such materials actively and effectively suppress dusting of the expanded products as well. This combination of features and observations has led to the development of effective drying, and optional expansion, of microspheres by mixing such particulate opacifier components into the wet cake, followed by drying, optionally vacuum drying, and recovery of the dry, free-flowing product. As an alternative, it is believed that a more reproducible composite can be produced by pre-drying the microspheres at about 60 degrees C., and them mixing the dried microspheres with particulate opacifier. With either approach, the microspheres remain in the desired unicellular condition, and substantially free of undesirable agglomeration. The expansion can be up to the very limits of the microspheres, as established by prior efforts in the art, although the desired specific gravity may often be achieved with a lesser degree of expansion.

It is important to the present invention that in the context of most uses of the dry, expanded microspheres, it is the specific gravity or composite density considerations which are most often of substantial importance. Even quite substantial proportions of the particulate opacifier components on a weight basis form a negligible or very minor component on a volumetric basis. For example, employing talc as the particulate opacifier component, the volume and weight relationships of the dry, expanded microspheres with varying amounts of talc show the relationships detailed in TABLE I.

TABLE I

EXPANDED MICROSPHERES BLENDED WITH TALC
MICROSPHERE CONTENT OF PRODUCT

| WEIGHT % | VOLUME % |
| --- | --- |
| 80 | 99.6 |
| 50 | 98.6 |
| 20 | 94.4 |
| 10 | 88.2 |
| 5 | 78.0 |
| 3 | 67.6 |

NOTES:
Data are based on Microspheres at 0.04 gm/cc and the talc at 2.70 gm/cc.

As the relationships in Table I show, even quite large proportions of talc by weight represent a minor fraction of the volume of the dry expanded product. It may be advantageous to employ more than one type of particulate opacifier component in mixtures and combinations with one another.

It has been observed that with appropriate levels of such particulate opacifier components, the tendency of the microspheres to agglomerate, or to stick to heated surfaces of drying equipment is effectively eliminated, and the dusting of the final expanded product is materially reduced, if not effectively eliminated.

As those of ordinary skill in the art will readily recognize, there are a substantial number of parameters which govern the method and the products produced in the present invention. Each of the known parameters is hereafter discussed in turn in relation to the present invention.

Microspheres are generally available in the form of a wet cake, which is typically about 35 percent water, about 65 percent unexpanded microsphere beads, and minor additional amounts of the materials employed in the manufacture of the microsphere beads by the process of the Morehouse patent, i.e., "wetting agents."

The most readily available domestic microspheres are those available from Pierce & Stevens Corporation, 4475 Genesee Street, Buffalo, N.Y., under the trademark "EXPANCEL TM" which are polyvinylidene chloride microspheres with an inclusion of isobutane as the bowing agent. (EXPANCEL TM is a registered trademark of Casco Nobel AB, a corporation of Stockholm, Sweden.) The available materials are preferred in the present invention, primarily for their availability and reasonable cost.

As the Morehouse patent indicates, microspheres can be made from a rather wide diversity of thermoplastic polymers. In practice, the commercially available microspheres are generally limited to polyvinylidene chloride. Microspheres of other materials, such as polyacrylonitrile, poly-alkyl methacrylates, polystyrene, or vinyl chloride, are known, but these materials are not widely and generally available. The present invention is applicable to any thermoplastic of which microspheres is made, but since the polyvinylidene chloride materials are those most available to the art, the discussion herein will be directed predominantly to that material, and to "ROPAQUE OP-62" as mentioned above. As those of ordinary skill in the art will readily recognize, the processing parameters will require adjustment to accommodate differing polymer materials.

A wide variety of blowing agents can be employed in microspheres. Again, the commercially available materials are more limited in range, most often being selected from the lower alkanes, particularly propane, butane, pentane, and mixtures thereof, suited to the polyvinylidene chloride polymer. As the Morehouse patent clearly sets forth, the selection of the blowing agent is a function of the particular thermoplastic polymer employed, and in the context of the present discussion, those ordinarily used with the commercially available microspheres are given the greatest attention. Isobutane is most often used with polyvinylidene chloride microspheres, while water is the blowing agent in "ROPAQUE OP-62".

In unexpanded form, the microspheres can be made in a variety of sizes, those readily available in commerce being most often on the order of 2 to 20 microns, particularly 3 to 10 microns. It has been demonstrated, for example, that microspheres can be made from as small as about 0.1 micron, up to as large as about 1 millimeter, in diameter, before expansion. In the present invention, lower particle sizes, i.e. in the range of from about 0.1 to about 10 micrometers, preferably about 0.2 to about 3 microns, are generally preferred, as an aid in leveling of the coating formulations into which the opacifier is incorporated.

While variations in shape are possible, the available microspheres are characteristically spherical, with the central cavity containing the blowing agent being generally centrally located.

Dry, unexpanded microspheres typically have a displacement density of just greater than 1 gm/cc, typically about 1.1 gm/cc.

When such microspheres are fully expanded, they are typically enlarged in diameter by a factor of 5 to 10 times the diameter of the unexpanded beads, giving rise to a displacement density, when dry, of 0.1 gm/cc or less, often about 0.015 to 0.06 gm/cc.

While the microspheres are produced in an aqueous suspension, it is common to break and de-water the suspension, and to supply the microspheres in the form of a "wet cake." This avoids shipping larger than necessary quantities of the aqueous system.

The solids content of the wet cake is substantially all unexpanded microspheres, but also includes the suspension components, including the wetting agents, so that the remaining water in the wet cake is extremely difficult to remove.

The present invention is based on the use of conventional contact type, indirect heat exchange mixing driers. A wide diversity of types of equipment are applicable. In general terms, the requirements are for good temperature control, good mixing of powder and granular materials, optionally with operation at reduced pressure provided, and the removal and recovery, preferably with condensation of the evaporated water and entrained blowing agent. Cooling of the microspheres, either in the mixing drier itself, or in ancillary equipment is also preferred.

There is a great diversity of driers available, at almost any desired scale of operations which meet the foregoing criteria with a capability of either batch or continuous operation in the context of the present invention. As a general rule continuous operation is preferred.

Among the commercially available driers with which the present invention has been employed are the following:

(1) Luwa Corp: Horizontal Thin Film Contact Driers
(2) Charles Ross & Son: Ross-Bolz Cone Screw Drier These quite different units have performed quite satisfactorily in the practice of the present invention, as shown in the examples, infra.

The particulate opacifier component in the present invention is any one of a wide diversity of materials which meet the requirements of the intended function. It is required that the particulate opacifier component be a free flowing solid at the temperature and pressure of the drying operation, that it not react chemically with the microspheres, or with the other constituents of the system, e.g. the wetting agents and related components of the wet cake, and that at the temperature of the expansion, that it function to separate the microspheres undergoing expansion so that they do not come into contact and bond to one another. It is also required that the particulate contribute opacity to the coatings to which the composite is incorporated. Substantially all known opacifiers commonly employed in the coating industry will meet these criteria, and thus, can be employed in the present invention with the adaptations required herein.

The particulate opacifier component may be selected from one or more components meeting the following general characteristics:

The opacifier component should be a finely divided particulate solid material, and should be a free-flowing solid under the processing conditions of the present invention. It should have a melting point, for example, above the temperature of the drying process, generally above about 250 degrees C. Most opacifier materials will have no difficulty meeting this requirement, of course.

The opacifier component must be finely divided enough to be able to effectively blend with and adhere to the surfaces of the microspheres. The maximum major dimension of the particle size should be no larger than about the diameter of the expanded microspheres, and preferably less. The minor dimensions will generally be as small as possible, effectively from about 200 millimicrons or less, up to as much as about 2.0 microns. Particle sizes having dimensions near the wave lengths of visible light, i.e., about 400 to 800 millimicrons, are particularly preferred. It is desirable in many situations to employ a blend of particle sizes, and it may be desirable in such circumstances to employ an increment of the opacifier component having even larger particle sizes as an aid to the drying process as taught in the prior parent applications.

The particulate opacifier components are desirably materials which are known opacifiers in coating formulations and thus are commonly used in the formulations where the microsphere composite materials are to be used. For example, titanium dioxide, talc, calcium carbonate, barium sulfate, alumina, silica, zinc oxide, mineral clays and the like may be employed. Other materials of interest may include spherical beads, or hollow beads, of ceramics, quartz, or glass. All these are typical and illustrative of the commonly employed materials in coating compositions, and those of ordinary skill in the art will be familiar with others that can also be suitably employed. Blends of such materials can be employed in many cases.

The selection of suitable particulate opacifier components among the wide diversity of materials that meet the general characteristics required of such materials is generally a matter of balancing a number of functional requirements in the procedure of the invention and in the context of the intended uses of the product. Among the criteria that will guide those of ordinary skill in the art are the following:

The primary function of the particulate opacifier component during the manufacture of the composite is to prevent the microspheres from coming into direct contact with one another and with the surfaces of the processing equipment while in a tacky, thermoplastic state, and thus to prevent them adhering. The opacifier provides this result by virtue of adhering to the tacky surfaces of the microspheres as soon as they reach a tacky state, and continuing to adhere throughout the process. The opacifier component thus becomes adhered to or partially embedded in the surface of the microspheres, and forms a buffer between the thermoplastic material and any other materials with which it might otherwise come into contact.

When combinations of different materials are employed as the particulate opacifier component, it is possible to stay within the compounding requirements of virtually any designed formulation.

By virtue of the higher density of the particulate opacifier component than that of the expanded microspheres, the composite product has a greatly reduced tendency to become entrained in gas streams or in the environmental atmosphere. As those of ordinary skill in the art will readily appreciate, the tendency to dusting is a material safety hazard, both in terms of exposure of workers and in terms of fire and explosive hazards. Since the microspheres may contain an alkane blowing agent in substantial proportions, large quantities of these materials in the atmosphere presents a substantial problem in some circumstances. These difficulties, and the effort and expense of their resolution are minimized or eliminated altogether in the present invention.

Generally, the greater the density of the particulate opacifier component, the greater the reduction in the dusting problem. Since the major proportion of the product on a weight basis is the particulate opacifier component, addition of a high density opacifier component to the system can effectively eliminate any dusting problems.

By virtue of the increased density of the composite, the demands on the processing equipment and system in recovering the expanded and dried microspheres from fluid streams is greatly facilitated, and product losses are substantially reduced.

The particulate opacifier component is used in the present invention in an amount sufficient to permit the drying and expansion of the microspheres without sticking to the equipment employed or forming agglomerations of microspheres. While this amount will vary depending on the particular equipment employed, and with the particular processing conditions, it will most often be on the range of about 20 to 97 weight percent of the mixture of opacifier component and microspheres, on a dry weight basis. As a general rule, in most circumstances the amount employed should be the amount that will reliably and consistently achieve the target specific gravity of the composite after any expansion that may be planned. It is generally preferred that the opacifier component be employed in amounts less than 90, and preferably less than 80 weight percent of the blend. This normally results in a dry expanded product which is more than 90 volume percent microspheres.

Since the predominant concerns in most uses of microspheres is with the volumetric proportions, even quite considerable proportions by weight of the inorganic particulate opacifier component can be included without detriment in the end uses. When substantial amounts of the particulate opacifier component are introduced as a component of the composite microsphere formulation, appropriate allowances for this component should be made in the compounding of coating materials. Thus, the proportion of the volatile water or solvent system in the coating composition can often be reduced as well as the proportion of the opacifier agent required for the desired opacity.

In the present invention, contact drying of the microspheres is accomplished with active mixing, optionally at low pressure, in the presence of the particulate opacifier component. The term contact heating is employed in the present application to connote heating or drying involving procedures other than direct heat exchange in a heated fluid, particularly in a heated gas stream. Contact drying processes employing indirect heat exchange are generally well known in other contexts, but in the context of the present invention, must be adapted to accommodate the particular and unusual conditions of operation, as described infra.

Contact drying, including vacuum drying, is widely practiced for very diverse and demanding operations which are temperature sensitive. Reducing solutions, suspensions, dispersions, slurries and semisolid wet cake to dry, free-flowing granular solids is commonly achieved in many industries with a great diversity of products. There are a substantial number of types of equipment in common use, substantially any of which can be adapted to use in the present invention. Most such equipment employs indirect heat exchange, using steam, heated oil, or the like as a heat transfer medium. Such drying operations commonly employ mixing means to distribute the material within the drier, and to prevent agglomeration of the material. Reduced pressures range from atmospheric downward below atmospheric to as low as 1 mm Hg absolute in such operations.

Such drying operations are employed in some contexts with thermoplastic materials, although not at temperatures at which the thermoplastic melts or softens, since at a point near the melting point or the glass transition temperature of thermoplastic polymers, a highly tacky state arises, which would result in severe agglomeration into a relatively monolithic mass and sticking to the equipment.

It has now been discovered that such equipment can be employed for drying and expanding thermoplastic microspheres, at temperatures at which the thermoplastic material becomes tacky and adherent, by virtue of the action of the particulate opacifier component and the continuous mixing, which combine to prevent sticking to the equipment and agglomeration of the microspheres.

It is also common in such equipment to remove and condense the "distillate" removed from the solid. Since this is done on a continuous basis, the hazards in the present system as a consequence of accumulations of the highly flammable or explosive blowing agent are avoided. The blowing agent, typically isobutane, is continuously removed and condensed in such equipment. This eliminates the need, as has been common in the drying of microspheres by spray drying procedures, of employing a nonoxidizing atmosphere in the drying chamber. Use of air, or other oxygen containing gases has proved an unacceptable fire and explosion hazard in such systems, and most are operated by employing nitrogen or some other inert gas as the heat exchange medium. Inert gas direct heat exchange is quite expensive, and still requires care in the handling of the substantial gas stream with the blowing agent carried with it, and thus solves only a part of the hazard.

The equipment selected for use must, rather evidently, provide for adequate heat transfer to remove substantially all the water from the feed stock. The significant control parameters for any given equipment will be residence time, pressure, and heat input, normally based on operating temperature for convenience. At the residence time and pressure employed, heat exchange must be accomplished within the constraints of the temperature limitations of the microspheres, which cannot be permitted to reach a temperature at which the blowing agent bursts the sphere.

The equipment must also provide the energy for the expansion itself. This is not large, and in most circumstances achieving a bead temperature (depending on the specific polymer) at which expansion occurs, as previously defined, there will be little difficulty in attaining the desired degree of expansion. In most circumstances, full expansion is desired, i.e., to a microsphere density of less than 0.06 gm/cc, preferably about 0.02 gm/cc (without the contribution of the particulate opacifier component). This refers to the true densities of the microspheres and not the bulk or apparent densities.

The important temperature limitations are defined by the thermoplastic polymer. It is important not to melt the polymer mass, so that the hollow spherical structure is lost through over expansion. On the other hand, if the temperature is not high enough to soften the polymer and to develop an adequate pressure of the blowing agent, expansion may not occur, or may be insufficient. Residence time at the appropriate temperature is also an important control parameter, since there is a definite duration for the expansion process. Even when adequate temperatures are achieved, if the residence time at temperature is too short, the expansion may be insufficient. If the time is too long, the microspheres themselves may be disrupted, leaving broken spheres and polymer fragments and grit in the product, with attendant losses of production.

As a general parameter, the time and temperature to be achieved is determined by the nature of the polymer of which the microspheres are made, and the degree of expansion required to attain the target specific gravity. The temperatures are generally near, but not materially above, the glass transition temperature of amorphous materials and the melting temperature of crystalline polymers. These matters are discussed in more detail in the Morehouse patent.

It is the function of the particulate opacifier component to prevent the formation of aggregates of the microspheres to the maximum attainable degree. In most drying equipment this particular requirement is facilitated by the use of continuous, often relatively high speed, low shear mixing of the material in the drier. It is worth note that excessive shear in the mixing operation may result in disrupting the microspheres, and must be avoided.

It is generally believed, although applicants have no wish to be bound thereby, that the particulate opacifier components in the present invention function to adhere to the surface of the microspheres as they reach a temperature at which the polymer material becomes tacky. By such adherence over the surface of the particles, the superficial layer of the opacifier component precludes surface bonding between microspheres as they come into contact.

It is one of the unique features of the present invention that the microsphere beads can be dried without expansion. This has not been possible in any effective process in the prior art. Such a result is achieved by drying at temperatures below that at which the microspheres soften, and where the internal pressure of the blowing agent is less than that needed to cause expansion. Since the microspheres typically expand at temperatures on the order of about 120 degrees C., drying can proceed effectively at lower temperatures. By use of reduced pressures, the drying can proceed at considerable rates.

The degree of expansion can range from substantially none, to the known limits of expansion. This parameter is determined by the temperature, the residence time at temperature, and to a lesser degree, by the pressure in the system. By balancing these parameters against the requirements for evaporating the water, substantially any degree of expansion and the targeted specific gravity for the intended use can be attained.

If the particulate opacifier is to be added to wet cake, it is important to have the opacifier component well dispersed in the continuous phase during the drying operation. This requirement ordinarily mandates a pre-mixing operation to disperse the particulate opacifier component into the wet cake before it is fed to the drier. In some cases, there may be adequate mixing in the drier to achieve adequate dispersion before the point at which the drying proceeds to the extent that requires uniform dispersion, but in most circumstances, those of ordinary skill in the art will recognize, a pre-mixing step will insure better results. It will generally not be necessary to add wetting agents or surfactants into the mixture in order to attain adequate dispersion because of the wetting agents already present in the wet cake.

The microsphere beads expand at a temperature which is a function of the specific polymer and blowing agent employed. Typically, expansion occurs at about 120 degrees Centigrade. At reduced pressure, expansion may occur at slightly lower temperatures.

Expansion requires that the blowing agent develop a substantial internal pressure (as compared with the external pressure), and that the polymer become softened enough to flow under the effect of the internal pressure. This generally means that the polymer must be heated to a point near its melting or glass transition temperature, or very slightly above. If the polymer temperature is too high, the microspheres will overexpand, burst, and collapse. The range of actual temperatures necessary will depend upon the specific microspheres utilized, i.e. the polymer therein. At temperatures near the upper limit, the residence time at temperature should be brief.

It will often be desirable to conduct the drying operation at reduced pressure to accelerate the rate of the water removal. Thus, in the present invention, pressures from ambient to as low as 1 mm Hg absolute have been employed with success. As those of ordinary skill in the art will readily recognize, the balancing of time, temperature, and pressure can be readily adapted to the substantially complete removal of the water and the appropriate expansion of the microsphere beads. Particularly when little or no expansion is wanted, low pressure drying greatly facilitates low temperature operations at which the expansion of the microspheres does not occur.

As the temperature is raised to the point at which the microspheres begin to soften and expand, and their surface area becomes tacky, the particulate opacifier component will adhere to the surface. Good mixing operates to maximize the extent of contact between the particulate opacifier component and the microspheres at this stage in the process. The extent of the mixing is not narrowly critical, so long as a relatively homogeneous dispersion of the opacifier component and the microspheres is maintained, and so long as the mixing does not disrupt the structure of the microspheres.

It is generally preferred to actively cool the dried and expanded microspheres before they are collected and packaged or otherwise handled. When reduced pressure is employed in the drier, it is preferred that the microspheres be stabilized by cooling before the pressure is increased. This minimizes the degree to which the pressure change can operate on the polymer and possibly disrupt the system while the polymer is in the plastic state.

The resulting dry microspheres can be conveniently recovered from the drier, collected and handled by entirely convention procedures and equipment usually employed in such drying operations for dealing with powdered or granular materials.

The result of the process is the production of a unique form of the composite opacifier-microspheres. The composite will comprise the microspheres which have an adherent surface deposit of the particulate opacifier component, ordinarily adhered to or partially embedded in the surface of the polymer material. When an excess of the particulate opacifier component is used, there may be an additional amount of free material entrained in, but not bound to the surface of, the microspheres. The particulate material may form a discontinuous layer on the surface, or in other circumstances may completely coat the surface in a continuous layer. By varying the proportions of the opacifier component and the microspheres, either condition may be attained. Depending on the intended environment of use, either condition may be preferred. For example, when the microspheres are to be incorporated into a coating polymer matrix which does not readily wet and bond to the polyvinylidene chloride, the adhered or embedded particles of the particulate opacifier component can function effectively as a "primer" or "key" coating on the beads, resulting in improved bond strength in such circumstances. In other cases, where the polymer binder forms strong bonds directly to the polyvinylidene chloride, a discontinuous coating of the opacifier component may result in better bonding.

The composite opacifier-microspheres of the present invention are essentially a dry, free-flowing powder, but can contain up to about 5% moisture and retain its free flowing characteistic. Because there will still be a residuum of the "wetting agents" remaining from the limited coalescence process by which the microspheres were made, the product will be slightly hygroscopic, and unless protected from ambient moisture, will gradually take up additional water. The materials involved are not so strongly hygroscopic, however, that this is a major problem. In most circumstances, unprotected microspheres will tend to stabilize at a water content of about 1.5 weight percent. The microspheres will remain a free flowing powder even under such conditions. When formulating aqueous based coatings, the moisture content of the opacifier can generally be ignored.

The microsphere product of the present invention can be unexpanded, or can be expanded to very near the limit of expandability, i.e., to a density of between 0.010 and 0.015 gm/cc. Intermediate values are also possible. When the particulate opacifier is taken into account, the composite density will, of course, be higher, and should have a density within the broad range of 0.1 to 2.8 gm/cc, and preferably within the range 0.15 to 1.5 gm/cc to make a non-floating, non-settling product. Utilizing "ROPAQUE OP-62", excellent composite has been produced having a density of 2.8 gm/cc. Thus the composite density of the product will be determined by the density of the particular opacifier component employed, the amount of the opacifier component included, and the degree of expansion. Those of ordinary skill in the art will be able to readily determine the composite density of the product from the information provided in Table I, hereinabove.

The opacifier component of the composite is adhered to or embedded in the surface of the microsphere, and is believed not to be in direct contact with the gases on the interior of the microsphere structure. Thus, so far as is presently known, there is no opacifier-air interface present. In that context, it has been surprising to observe that the performance of the composite is fully equivalent to that which would be anticipated if there were such an interface. Observed hiding power of the formulations with the composite of the present invention are typically about 225 to 250 percent of the values predicted by the Lorentz-Lorenz equations for titanium dioxide-polyvinylidene chloride interfaces, and are fully equivalent to those anticipated for titanium dioxide-air interfaces. The degree of enhanced hiding power is even greater for other, less efficient opacifiers. In the case of talc-microsphere composite opacifier, for example, the hiding power is often in excess of 100 times that for the talc alone.

These observations are not fully understood, and have been incompletely investigated at the present, but it is believed possible that the expansion of the microspheres preferentially reduces the thickness of the polyvinylidene chloride film at the points at which the embedments of the solid particles are located, so that the film is reduced to dimensions of thickness substantially less than the wave length of visible light, where refractive behavior is substantially altered, and in the present context ceases to be a material factor in the refraction characteristics of the composite. The thickness of the microsphere wall has been observed to be on the order of about 30 to 50, typically about 40 millimicrons, while the wave lengths of visible light are, of course, from 400 to 800 millimicrons.

As a consequence, the behavior of the opacifiers in the present invention is fully consistent with the attainment of high levels of porosity and air entrainment in coatings, fully equivalent to the behavior of such systems with opacifier loadings substantially in excess of the "CPV" even when materially less opacifier than that required to attain the CPV is employed. On the other hand, the deleterious effects on the performance of coatings as a consequence of the entrainment of air and the introduction of porosity is substantially completely avoided.

The composites are compatible with a very wide and broad diversity of paint binders, vehicles, and ancillary components. The sole limitations are that the formulation must not dissolve the material of the microspheres (which may in some cases be assured by treating the microspheres to assure such a result), and the conditions of the making up of the formulation must not disrupt the physical structure of the microspheres. Hence, if any components require grinding or milling, those steps should be conducted before the inclusion of the microsphere based composite. The opacifying constituents are quite insensitive to such matters and do not pose any limitations on the make up of the formulations into which the composite is added.

The composite opacifiers of the present invention are readily incorporated into paints, inks, and other coating formulations with little effort or difficulty. When the vehicle of the formulation wets the polyvinylidene chloride or the opacifying constituent, the composite will be quite readily dispersed in the formulation with nothing more than simple mixing. In an aqueous media, of course, the wetting agents employed in the manufacture of the microspheres will generally remain present, so that dispersion in aqueous systems is generally quite simple. In other vehicles, it will ordinarily suffice to wet the composite with a surfactant or wetting agent appropriate to and compatible with the vehicle.

In some cases, it may be preferred to formulate the composite into a base with the coating binder, vehicle, and other suitable ingredients, designed to be mixed with other components which are formulated separately, such as color concentrates, and the like.

The specific gravity of the composite opacifier is regulated, by determining the relative proportions of microspheres and components and the degree of expansion of the microspheres to provide a specific gravity which approximates that of the coating vehicle. By this feature of the invention, the tendency of the opacifier components to separate from the coating formulation is very slight or non-existent. This is a particular advantage, as those of ordinary skill in the art will readily recognize.

As a consequence of the high volume of the composite in relation to the amount of the opacifying power, and the hiding power of the coating formulation into which it is incorporated, it has been found that the weight per unit volume for a given hiding value will be greatly reduced, and in substantially all cases will be less than the CPV or "critical pigment volume". While there is no fundamental reason the CPV of the coating system may not be exceeded, there will rarely be any benefit in doing so when utilizing the composite of this invention. Furthermore, some of the advantage of the present invention, predicated on the avoidance of the introduction of porosity and the physical effects on the coating film will be lost by exceeding the CPV, so that such loading levels will not often be desirable for economic reasons and for the degradation of the coating that comes with such procedures. Since weight is a primary characteristic of paints and coating formulations, there can be material savings as a consequence of these effects, in reducing shipping and handling costs, and in affording greater ease of handling of such materials.

In light of the enhanced performance of the opacifiers of the present invention when contrasted to the opacifying component as used alone in the prior art, it is often possible to reduce the amount of such component by a material proportion, often as little as half or less of the amount formerly required being effective to attain the same opacity and hiding power. It is also frequently possible to employ a less expensive grade of opacifier material, or even a different material of lower opacifying capacity, as a consequence of the enhanced effectiveness of the composite form. Since the opacifiers are, as a general rule, the single greatest cost component of paints and other coating formulations, the savings made possible by the present invention can be quite substantial. The inclusion of the microsphere component is a quite minor and modest cost factor in relation to the savings made possible by the reduction of the titanium dioxide, say, by one half or thereabouts, or the substitution, in whole or in material part, of inexpensive talc for titanium dioxide.

It is of course necessary to take appropriate steps to adapt the composite to the specific formulation into which it is to be formulated. As those of ordinary skill in the art will readily recognize, the polymer of the microsphere component must not be soluble in the formulation or any component therein. For most common paint vehicles, this is a readily attained objective.

TESTS AND EXAMPLES

Test 1.

As already noted, the use of the composite opacifier-microspheres in paints and other coatings has given greater than predicted opacity. This synergistic effect may be due to the light scattering power of the microspheres themselves, the dilution effect of titanium dioxide (Above ten volume percent titanium dioxide the efficiency of hiding is drastically reduced), or the unexpected synergism of titanium dioxide attached to the microspheres, or a combination of all or any of these effects.

In order to obtain a quantitative measure of the synergistic effect, the film scattering coefficient of several samples were first determined, and then these values contrasted to those predicted so that the percent enhancement in opacity could be calculated. The film scattering coefficient of seven test samples were determined using the procedure described in the Official Dioest. Sept. 1963, pp. 871-911, P. B. Mitton and A. E. Jacobson, giving a Kubelka-Munk scattering coefficient in mil1 Table II below lists the values for the scattering coefficients for the seven samples tested.

TABLE II

FILM SCATTERING COEFFICIENT ($Mil^{-1}$) OF SEVEN TEST SAMPLES

| | Scattering Coefficient ($Mil^{-1}$) | Titanium Dioxide Volume Fraction | Microspheres Volume Fraction |
|---|---|---|---|
| 1 | 4.52 | 0.120 | 0 |
| 2 | 8.34 | 0.215 | 0 |
| 3 | 8.78 | 0.291 | 0 |
| 4 | 1.76 | 0 | 0.350 |
| 5 | 1.60 | 0 | 0.410 |
| 6 | 7.34 | 0.075 | 0.405 |
| 7 | 9.01 | 0.070 | 0.520 |

From Table II can be seen the decreasing efficiency of titanium dioxide as the volume fraction increases. A similar effect can be seen for volume decreases in microspheres.

When two scattering particles are present, the contribution of each particle should in theory depend on the volume fraction of each multiplied by the scattering coefficient. The equation for this is $S = S_1 V_1 + S_2 V_2$, where S is the scattering coefficient and V is the volume fraction present. Using this equation one can calculate the individual scattering contributions of each constituent and the theoretical total. By contrasting this total to the above values, "any synergistic effect can be determined. The film scattering coefficients for titanium dioxide and for microspheres was determined over a volume percent of 0.05 to 0.60 to be 38 and 6 $mil^{-1}$ respectively. For the sample 6 composite in Table II, S $(0.075)(38) + (0.405)(6) = 2.85 + 2.43 = 5.28$. On the other hand, the value measured as shown in Table II was 7.35. Therefore, the synergistic effect was $7.35 - 5.28 = 2.07$. Accordingly, the percent enhancement in opacity was $(2.07/2.85)100\% = 73\%$, while the total enhancement ratio over that of titanium dioxide was $(7.35/2.85)100\% = 258\%$.

Similarly for sample 7 composite in Table II, the calculations show: $S = (0.07)(38) + (0.52)(6) = 2.66 + 3.12 = 5.78$ $mil^{-1}$. However, the measured value was 9.01. Therefore, the enhancement in coefficient was $9.01 - 5.78 = 3.23$. Accordingly, the enhancement in opacity was $(3.23/2.66)100\% = 121\%$, while the total enhancement ratio over that of titanium dioxide was $(9.01/2.66)100\% = 399\%$.

Test 2.

The lower value for the scattering coefficients for microspheres and the inventive composites with microspheres in contrast to titanium dioxide, requires that a thicker film be used to obtain 98% hiding power typically required for paint films and other coatings. A contrast ratio of 0.98 is required where the contrast ratio is defined as the ratio of the reflectance over a black/white Leneta chart. Judd and Wyszecki in their book *Color in Business, Science and Industry*, Wiley, N.Y, N.Y., 1963, defined equations which allow film thicknesses, X, to be calculated if the film scattering coefficients, S, are known, where film reflectivity R $= 94\%$ and substrate reflectivity Rs $= 80\%$.

Rearranging the book's equation for ease of calculating gives the following equation:

$$X = (R - R_s)/S(1 - R_s)(1 - R_0)$$

The Kubelka-Munk equation was derived with terms that quantize the absorption of incident energy. The average of visible light, 0.55 microns, was used for this equation. Titanium dioxide and microspheres do not absorb energy at this wave length. Terms relating to the absorption of energy in the original Kubelka-Munk equation were eliminated to permit use of the simplified equation shown above. Table III below provides film thicknesses required for 94% hiding when the scattering coefficient is known. These data are for film reflectivity of 94%, substrate reflectivity of 80%.

TABLE III

| Scattering Coefficient (Mil$^{-1}$) | Film Thickness (mils) | Material | Volume Fraction |
|---|---|---|---|
| | FILM THICKNESS FOR 98% HIDING POWER | | |
| 38 | 0.61 | TiO$_2$ | 0.50 |
| 6 | 3.89 | MS | 0.50 |
| 7.34 | 1.59 | Sample 6 | Table II |
| 9.01 | 1.29 | Sample 7 | Table II |

Different film thickness would be obtained with different reflectivities.

Test 3.

In another study, a 50PVC paint was made using the composite opacifier-microspheres (50PVC 0/MS) and compared to a 50PVC prior art paint using only titanium dioxide (50PVC TiO2). The composite opacifier-microspheres, identified as "M6018", was a composite of titanium dioxide/microspheres at a ratio of 95.46/4.54. Table IV below shows how they compared.

TABLE IV

| Grind | 50PVC O/MS | 50PVC TiO$_2$ |
|---|---|---|
| Propylene Glycol | 8.1 | 5.8 |
| Tamol 850 | 0.9 | 1.9 |
| Colloid 643 | 0.28 | 0.2 |
| TiO$_2$ | | 43.6 |
| M6018 (O/MS) | 23.7 | |
| H$_2$O | 19.2 | 6.93 |
| SB8208 | 0.017 | |
| M73 | 0.003 | |
| Texanol | 1.8 | |
| Letdown | | |
| Rhoplex E1953 | 38.7 | 29.3 |
| H$_2$O | | 4.1 |
| Texanol | | 0.8 |
| Nuosept 95 | 0.1 | 0.08 |
| Triton GR-7M | 0.1 | 0.08 |
| Thickener | | |
| H$_2$O | 6.9 | 7.1 |
| Natrosol 250 MHBR | 0.2 | 0.2 |
| | 100.00 | 100.00 |
| Hiding Power 1 mil dry | 85 | 97 |
| Volume Solids % | 35 | 35 |
| Density Opacifier gm/cc | 1 | 4.2 |
| Thickness for 98% Hiding Power | 1.90 | 1.0 |

Resistance to loss of hiding and opacity was measured with water. The dry film, about 2 mils dry, was applied to a Leneta chart. After three days the contrast ratio was 98%. The samples were then covered with water and a watch glass was placed over the water to prevent evaporation. After 24 hours, the watch glass was removed and the hiding was measured. A reading ratio of 98% indicated no loss of hiding or opacity as is experienced with coatings that have "dry" hiding, where the critical pigment volume has been exceeded and where air is present. Replacement of air by water causes loss of hiding in other paint films.

Example 1—Alkyd Paint.

An alkyd paint was made using the M6018 composite of this invention as follows:

| M6018 | 24.0% |
|---|---|
| Soya Alkyd Resin | 28.8% |
| Drier | 00.4% |
| Mineral Spirits | 46.8% |
| | 100.0% |

This was a solvent based paint, 40 PVC. 98% hiding required a coating of about 2.6 mils dry.

Example 2—Epoxy Coating With Activator.

A coating mixture was prepared as follows:

| M6018 | 20.0% |
|---|---|
| Polyamid Resin | 20.0% |
| Urea Resin | 00.6% |
| Mineral Spirits | 46.2% |
| Glycol Ether | 13.2% |
| | 100.0% |

The activator was prepared as follows:

| Epoxy Resin | 61.2% |
|---|---|
| Propylene Glycol Ether | 38.8% |
| | 100.0% |

Equal parts of the coating and the activator were mixed thoroughly and allowed to pre-react for one hour. A coating was applied by brush to a dry thickness of about 4 mils. Hiding was 98% after a cure for three days.

What is claimed is:

1. The method of making an opaque coating comprising combining a film forming coating binder and a composite opacifier, said composite opacifier comprising dry expanded thermoplastic resin microspheres having an inorganic opacifying constituent adhered to and embedded the surface thereof, said opacifying constituent having a refractive index of greater than about 1.6, and said composite opacifier having a hiding power substantially equivalent to that of said opacifying constituent having a refractive interface with air.

2. The method of claim 1 wherein a major portion of said opacifying constituent has a particle size of from about 200 to about 2000 millimicrons.

3. The method of claim 1 wherein said opacifying constituent comprises from 20 to 97 weight percent of said composite opacifier.

4. The method of claim 3 wherein said opacifying constituent comprises less than 80 weight percent of said composite opacifier.

5. The method of claim 1 wherein a major portion of said opacifying constituent has a particle size of from about 400 to about 800 millimicrons.

6. The method of claim 1 wherein said composite opacifier has a specific gravity of from about 0.1 to about 2.8 gm/cc.

7. The method of claim 1 wherein said composite opacifier has a specific gravity of from about 0.15 to about 1.5 gm/cc.

8. A method of applying an opaque coating to a substrate comprising:
(a) forming a coating medium containing a film forming coating binder and a composite opacifier, said composite opacifier comprising expanded thermoplastic resin microspheres having an inorganic opacifying constituent adhered to and embedded in the surface thereof, and
(b) applying said coating medium to said substrate.

9. The method of claim 8 wherein a major portion of said opacifying constituent has a particle size of from about 200 to about 2000 millimicrons.

10. The method of claim 8 wherein a major portion of said opacifying constituent has a particle size of from about 400 to about 800 millimicrons.

11. The method of claim 8 wherein said opacifying constituent comprises from 20 to 97 weight percent of said composite opacifier.

12. The method of claim 8 wherein said composite opacifier has a specific gravity of from about 0.1 to about 2.8 gm/cc.

13. The method of claim 8 wherein said composite opacifier has a specific gravity of from about 0.15 to about 1.5 gm/cc.

* * * * *